(12) United States Patent
Lindloff

(10) Patent No.: US 8,887,974 B2
(45) Date of Patent: Nov. 18, 2014

(54) ADJUSTABLE ACCESSORY SUPPORT ASSEMBLY

(75) Inventor: Christopher D. Lindloff, New Richmond, WI (US)

(73) Assignee: Kuryakyn Holdings, LLC, Somerset, WI (US)

( * ) Notice: Subject to any disclaimer, the term of this patent is extended or adjusted under 35 U.S.C. 154(b) by 693 days.

(21) Appl. No.: 12/931,891

(22) Filed: Feb. 14, 2011

(65) Prior Publication Data
US 2012/0205411 A1    Aug. 16, 2012

(51) Int. Cl.
B62J 11/00 (2006.01)
B62J 7/00 (2006.01)
B62J 9/00 (2006.01)
B60P 3/34 (2006.01)
B62C 1/06 (2006.01)
B62D 33/08 (2006.01)
B62J 1/28 (2006.01)
B62J 7/04 (2006.01)

(52) U.S. Cl.
CPC .... *B62J 1/28* (2013.01); *B62J 7/04* (2013.01); *B62J 9/001* (2013.01)
USPC ........ 224/443; 224/418; 224/425; 296/26.09; 296/26.13

(58) Field of Classification Search
USPC .......... 224/443, 418, 425, 346.06; 296/26.09, 296/26.13
See application file for complete search history.

(56) References Cited

U.S. PATENT DOCUMENTS

| 4,266,703 | A | * | 5/1981 | Litz .............................. 224/443 |
| 5,544,998 | A | * | 8/1996 | Malinowski .................. 414/522 |
| 6,116,671 | A | * | 9/2000 | Schneider ................. 296/26.01 |
| 6,257,638 | B1 | * | 7/2001 | Graber ....................... 296/26.09 |
| 6,616,233 | B1 | * | 9/2003 | Debus et al. .................. 297/341 |
| 7,416,234 | B2 | * | 8/2008 | Bequette .................... 296/26.09 |
| 8,146,944 | B2 | * | 4/2012 | Miller .......................... 280/769 |
| 2004/0124683 | A1 | * | 7/2004 | Matsumoto et al. ....... 297/344.1 |
| 2005/0150921 | A1 | * | 7/2005 | Schneider ..................... 224/413 |
| 2006/0163302 | A1 | * | 7/2006 | Knoch et al. .................. 224/413 |
| 2008/0073396 | A1 | * | 3/2008 | Chiang et al. ................ 224/413 |
| 2011/0139843 | A1 | * | 6/2011 | Thomas et al. ............... 224/413 |

* cited by examiner

*Primary Examiner* — Brian D Nash
*Assistant Examiner* — Derek Battisti
(74) *Attorney, Agent, or Firm* — Dicke, Billig & Czaja, PLLC

(57) ABSTRACT

An adjustable accessory support assembly for a motorcycle accessory includes a base connectable to a support bracket mounted on a motorcycle and a slider accessory connectable to the motorcycle accessory and coupled to the base. The slider assembly is configured to transition from a first, locked configuration to a second, unlocked configuration. In the locked configuration, relative movement between the slider assembly and the base is prevented, whereas in the unlocked configuration, the slider assembly is moveable relative to the base to allow the motorcycle accessory to be repositioned relative to the support bracket.

8 Claims, 7 Drawing Sheets

ADJUSTABLE ACCESSORY SUPPORT ASSEMBLY

BACKGROUND

Motorcycles generally include several types of accessories that can be coupled thereto and serve various functions. One such accessory is a combination back rest and cargo carrier accessory attachable to the rear of the motorcycle. The back rest provides support for the back of a passenger riding on the motorcycle, while the cargo carrier is positioned behind the back rest. Current adjustable accessories employ adjustment mechanisms that can be cumbersome to adjust in an effort to secure the accessory to the motorcycle during motorcycle operation. Improvement in adjusting the position of an accessory in an easy and secure manner is thus desired.

SUMMARY

An adjustable accessory support assembly for a motorcycle accessory is disclosed. The assembly includes a base and a slider assembly coupled to the base. The slider assembly is configured to transition from a first, locked configuration to a second, unlocked configuration. In the locked configuration, relative movement between the slider assembly and the base is prevented, whereas in the unlocked configuration, the slider assembly is movable relative to the base.

In one example, the base forms first and second channels, wherein the slider assembly forms a first guide positioned in the first channel and a second guide positioned in the second channel. A first locking mechanism couples the first guide to the base and a second locking mechanism couples the second guide to the base. The first and second locking mechanisms transition the support assembly between the locked and unlocked configurations.

In a particular embodiment, each of the first and second locking mechanisms include a shoe positioned within a corresponding inner channel in the slider assembly. Cam assemblies coupled to each of the shoes are operated to draw each shoe toward the base plate and lock the slider assembly to the base plate. In a further embodiment, inserts are positioned between the slider assembly and the base to serve as a linear bearing between the slider assembly and the base.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
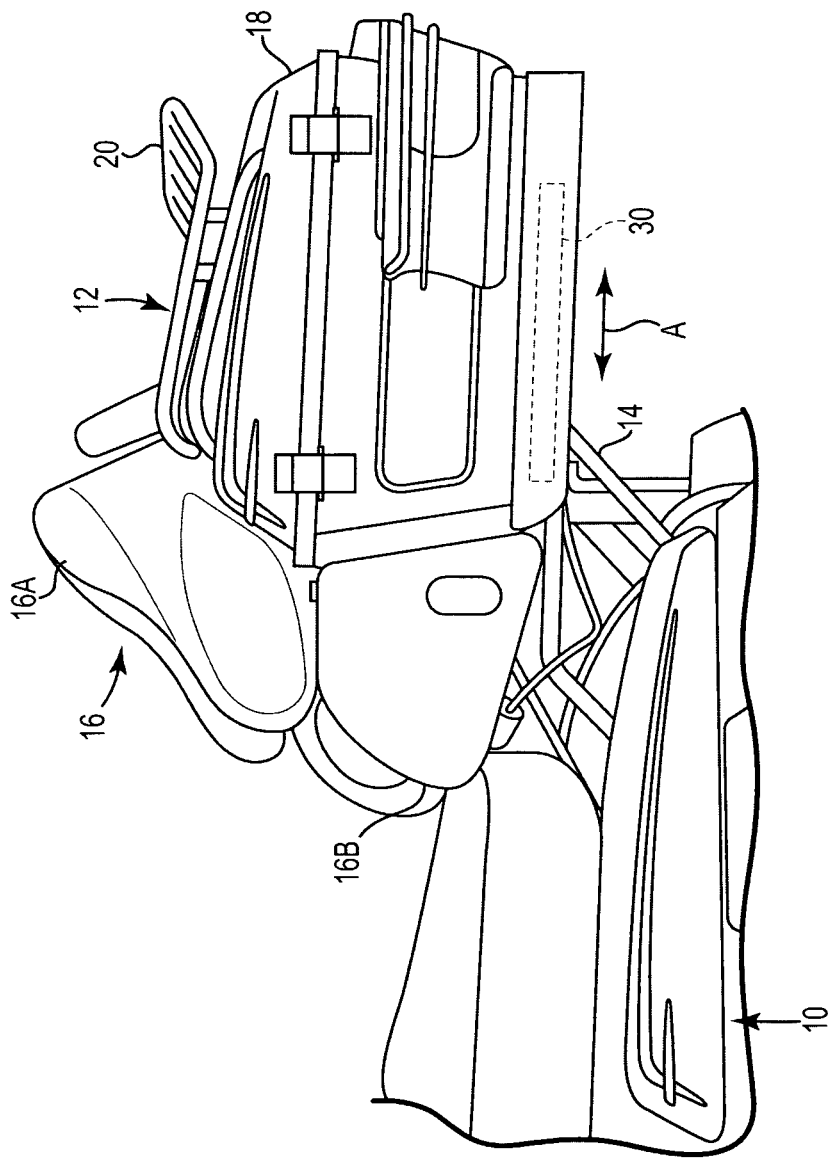
FIG. 1 is a partial side view of a motorcycle accessory coupled to a motorcycle.

FIG. 1 is a side view of a motorcycle 10 having an accessory 12 attached thereto through a suitable support bracket 14. As illustrated, motorcycle accessory 12 includes a back rest 16 (including an upper portion 16A and a lower portion 16B), storage container 18 and a luggage rack 20. Back rest 16 is connected to storage container 18, where upper portion 16A conforms to a top of container 18 and lower portion 16B conforms to a bottom of container 18. Each of the back rest portions 16A and 16B are cushioned to provide comfort to a passenger.

As discussed below, accessory 12 is adjustable with respect to the motorcycle 10. In particular, the accessory 12 is adjustably mounted to support bracket 14 through an adjustable accessory support assembly 30 (schematically illustrated in FIG. 1) illustrated in FIGS. 2-6. As discussed in further detail below, the support assembly 30 includes a base mounted to support bracket 14 and a slider assembly mounted to accessory 12. Furthermore, the adjustable accessory support assembly 30 can transition from an unlocked configuration, where accessory 12 is movable relative to the motorcycle 10, to a locked configuration, where relative movement between accessory 12 and motorcycle 10 is prevented. As such, a user is able to slide accessory 12 forward and/or backward (in a direction indicated by arrow A) to comfortably accommodate a passenger in the unlocked configuration and transition the assembly to the locked configuration.

FIGS. 2-6 illustrate an example of an adjustable accessory support assembly 30 that couples motorcycle accessory 12 to support bracket 14 of motorcycle 10. Assembly 30 includes a base 32 herein embodied as a base plate, configured to be mounted directly to support bracket 14, and a slider assembly 34, adjustably coupled to the base 32. Accessory 12 is, in turn, directly mounted to slider assembly 34 (i.e., at a bottom of container 18). Details of assembly 30 are provided below. In general, the assembly 30 is configured to transition from a first, locked configuration to a second, unlocked configuration. In the locked configuration, relative sliding movement (in a direction indicated by arrow A in FIG. 1) between slider assembly 34 and base 32 is prevented. In the unlocked configuration, slider assembly 34 can slide forward and/or backward (as indicated by arrow A) relative to base 32. As such, back rest 16 can be adjusted to a desired position to accommodate a passenger while assembly 30 is in the unlocked configuration. When accessory 12 is in the desired position, assembly 30 can be transitioned to the locked configuration, which allows motorcycle 10 to be operated without sliding movement of the back rest 16 relative to the motorcycle 10.

Figure 2:
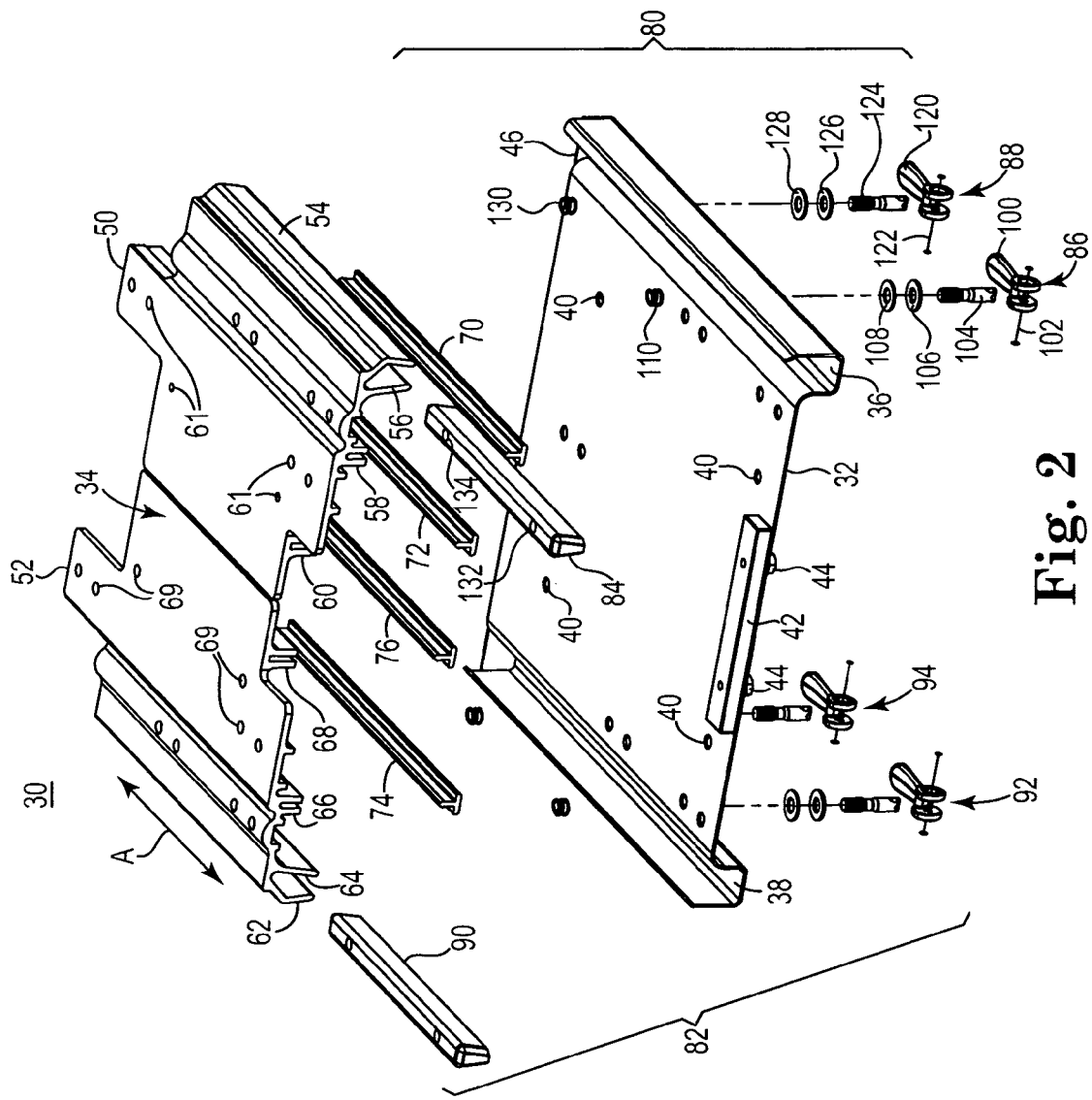
FIG. 2 is an exploded view of an adjustable accessory support assembly of the present invention.
Figure 3:
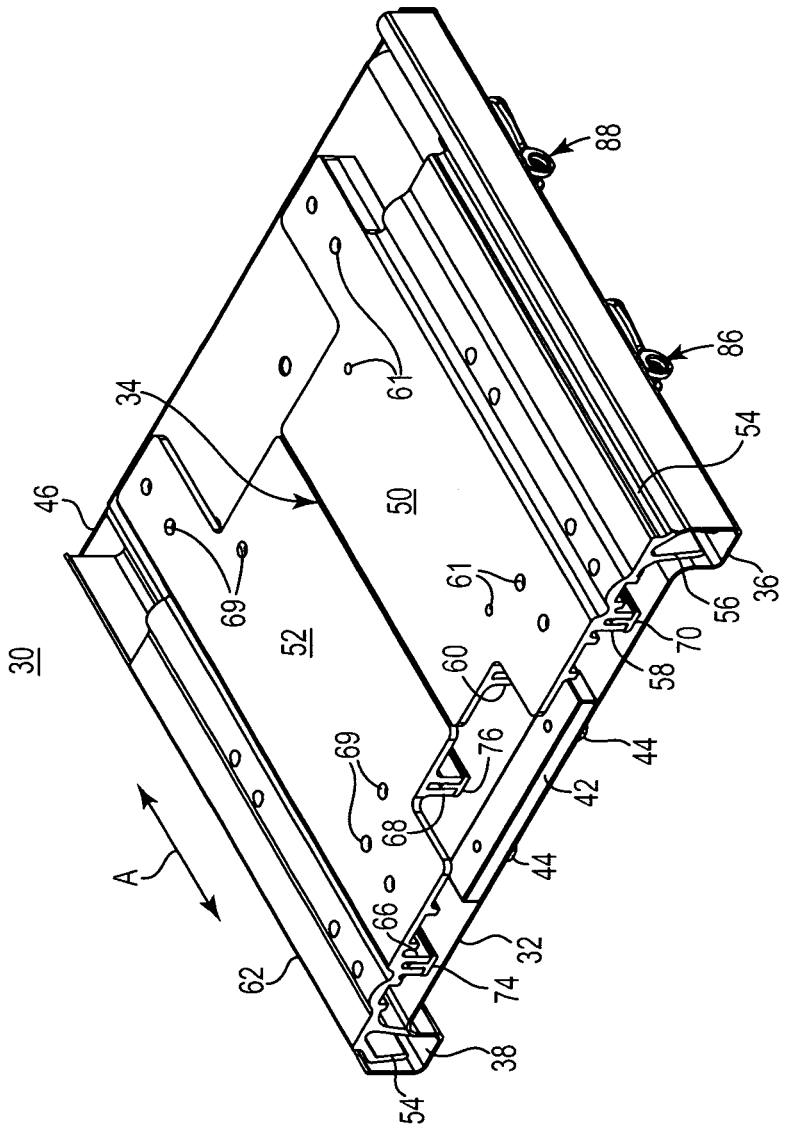
FIG. 3 is a perspective view of the accessory support assembly of FIG. 2 fully assembled.

As shown in FIG. 2, base 32 includes a first channel 36 and a second channel 38 positioned on opposite sides of the base 32 to receive a portion of the slider assembly 34. Moreover, base 32 includes a plurality of apertures 40 configured to receive fasteners to mount the base 32 to the support bracket 14. Alternatively, channels 36 and 38 are separate elements that form base 32 and be mounted separately to the support bracket 14. An overtravel stop 42 is mounted to a front of the base 32 with corresponding fasteners 44. Overtravel stop 42 forms a contact surface that prevents further movement of slider assembly 34 in a forward direction as slider assembly 34 moves forward and contacts overtravel stop 42. In particular, a front surface of slider assembly 34 (formed by insert receiving portions 60 and 68 discussed in more detail below) contacts overtravel stop 42. In a similar manner, a flange 46 is positioned at a rear of the base 32 and forms a contact surface to prevent further movement of slider assembly 34 in a rearward direction as slider assembly 34 moves rearward and contacts flange 46. In particular, a rear surface of slider assembly 34 (formed by guides 54 and 62 discussed in more detail below) contacts flange 46. As such, upon assembly of slider assembly 34 to base 32 and while in the unlocked configuration, relative movement of slider assembly 34 with respect to base 32 is restricted to a point where slider assembly 34 contacts stop 42 (in a forward most position) and a point where slider assembly 34 contacts flange 46 (in a rearward most position). In an alternative embodiment, one or both of stop 42 and flange 46 can be eliminated.

In one embodiment, base 32 is formed of a unitary piece of metal such as steel, in which base 32 is formed and flange 46 is bent downward in a stamping process and welded to channels 36 and 38. In a further embodiment, portions of base 32 can be chrome plated as desired.

In one embodiment, slider assembly 34 includes a first slider plate 50 and a second slider plate 52 positioned adjacent to one another and adapted to be coupled with base 32. Slider plate 50 includes a guide 54 defining a corresponding inner channel 56, a first insert receiving portion 58 and a second insert receiving portion 60. As discussed above, a rear surface of guide 54 contacts flange 46 in a rearward-most position of slider assembly 34 to restrict position of slider assembly 34 to restrict movement of slider assembly 34. In a similar manner, a front surface of a second insert receiving portion 60 contacts overtravel stop 42 in a forward-most position of slider assembly 34 to restrict movement of slider assembly 34. Additionally, slider plate 50 includes a plurality of apertures 61 (e.g., mounting holes) configured to receive suitable hardware for mounting the slider plate 50 to the base of an accessory (e.g., accessory 12 of FIG. 1). Guide 54 is shaped to slide within channel 36, the channel 36 forming an upper flange to partially enclose the guide 54.

Similarly, slider plate 52 includes a guide 62 defining a corresponding inner channel 64, a first insert receiving portion 66 and a second insert receiving portion 68. As discussed above, a rear surface of guide 62 contacts flange 46 in a rearward-most position of slider assembly 34 to restrict movement of the slider assembly 34, a front surface of insert receiving portion 68 contacts overtravel stop 42 in a forward-most position of slider assembly 34 to restrict movement of the slider assembly 34. Slider plate 52 also forms a plurality of apertures 69 (e.g., mounting holes) configured to receive suitable hardware for mounting to the base of an accessory (e.g., accessory 12 of FIG. 1). Guide 62 is shaped to slide within channel 38, the channel 38 forming an upper flange to partially enclose the guide 62.

In one embodiment, slider plate 50 and slider plate 52 are formed of a suitable metal such as aluminum, through an extrusion process. In an alternative embodiment, slider plate 50 and slider plate 52 can be formed from a unitary piece of metal material.

Each of insert receiving portions 58, 60, 66 and 68 comprise an elongate channel. Positioned within insert receiving portions 58, 60, 66 and 68 are T-shaped inserts 70, 72, 74 and 76, respectively, for example with a press fit. For each insert, a leg of the T is positioned within a respective insert receiving portion, where a base portion of the T forms a bearing between base 32 and slider assembly 34. In one embodiment, inserts 70, 72, 74 and 76 are formed of ultra high molecular weight polyethylene (UHMWPE) or other suitable material to serve as a linear bearing between slider assembly 34 and base 32. Additionally, inserts 70, 72, 74 and 76 create an "anti-friction" interface between slider assembly 34 and base 32 so as to prevent relative sliding movement between slider assembly 34 and base 32 when assembly 30 is in the locked configuration.

In order to transition assembly 30 between the locked configuration and the unlocked configuration, assembly 30 includes a first locking mechanism 80 coupling slider plate 50 with base 32 and a second locking mechanism 82 coupling slider plate 52 with base 32. In one embodiment, locking mechanism 80 includes a shoe 84, a first cam assembly 86 and a second cam assembly 88. Similarly, second locking mechanism 82 includes a shoe 90, a first cam assembly 92 and a second cam assembly 94. Locking mechanisms 80 and 82 allow for locking of slider assembly 34 relative to base 32 in continuous positions along a length of channels 36 and 38. In an alternative embodiment, locking mechanisms 80 and 82 can be configured to lock slider assembly 34 at discrete positions relative to base 32.

Figure 4:
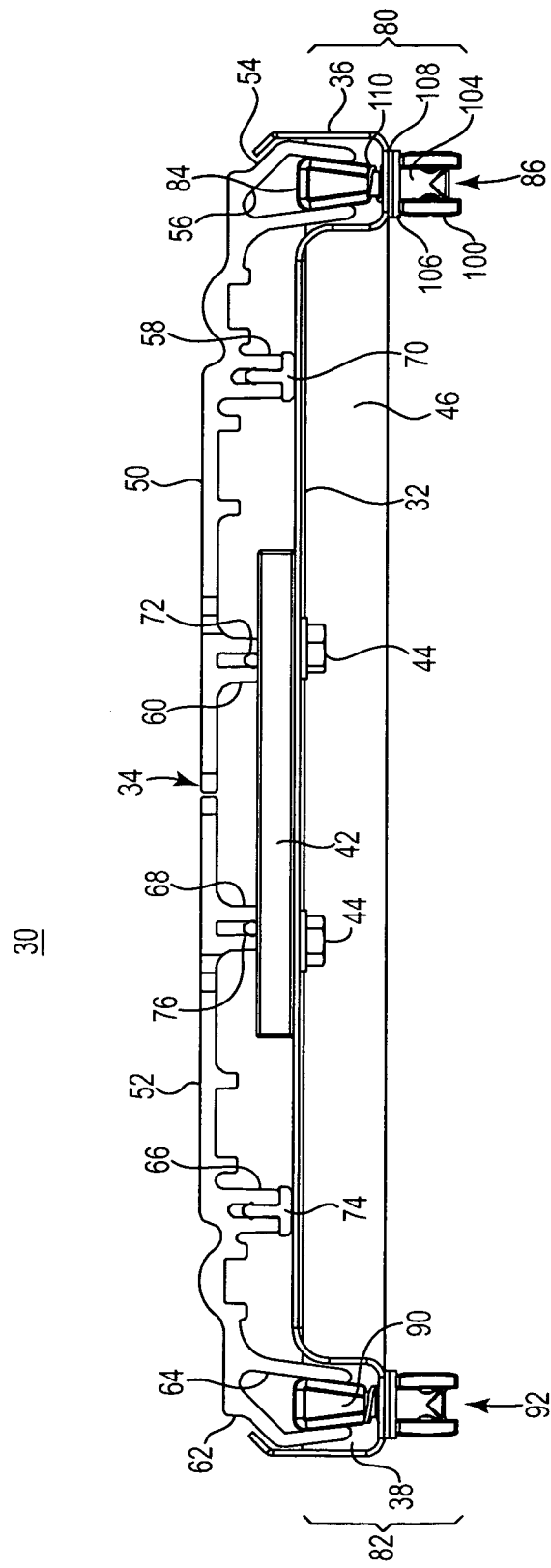
FIG. 4 is a front end view of the accessory support assembly of FIG. 2.
Figure 5:
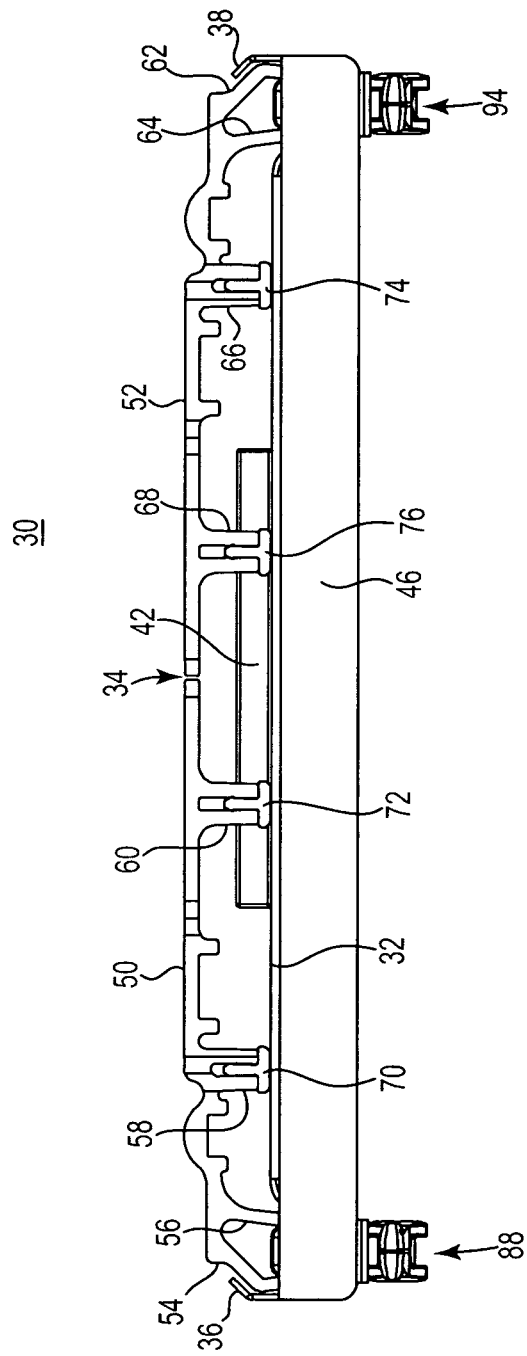
FIG. 5 is a rear end view of the accessory support assembly of FIG. 2.

In the embodiment illustrated, shoes 84 and 90 are each embodied as a tapered contact bar formed of a suitable metal such as aluminum. To assemble slider plate 50 to base 32, shoe 84 is inserted into inner channel 56. As best illustrated in FIG. 4, both inner channel 56 and shoe 84 narrow in width from top to bottom. Furthermore, shoe 84 is shaped such that an upper portion is disposed within inner channel 56 while a lower portion is positioned below inner channel 56. In particular, an outer shape of shoe 84 matches an inner shape of inner channel 56 such that inner channel 56 partially encloses shoe 84. Shoe 90 and channel 64 have a similar arrangement, as both narrow in width from top to bottom. As such, an upper portion of shoe 90 is disposed within inner channel 64 and a lower portion is positioned below inner channel 64 such that inner channel 64 partially encloses shoe 90.

Cam assemblies 86 and 88 are provided to draw shoe 84 and slider plate 50 toward base 32 and lock slider plate 50 from sliding movement relative to base 32. To this end, cam assemblies 86 and 88 extend through apertures (not shown) in channel 36 and are coupled to shoe 84 through a threaded shaft mated with a corresponding threaded bore in shoe 84. In particular, cam assembly 86 includes a cam lever 100, a connector 102, a threaded shaft 104, a metallic washer 106, a polymer washer 108 and a biasing mechanism (e.g., a spring) 110. Similarly, cam assembly 88 includes a cam lever 120, a connector 122, a threaded shaft 124, a metallic washer 126, a polymer washer 128 and a biasing mechanism (e.g., a spring) 130. It is worth noting that components of cam assemblies 86 and 88 are exemplary and other hardware components, materials and/or combinations capable of adjustably securing shoes 84 and 90 within their respective channels may also be suitable. In an alternative embodiment, shoes 84 and 90 can be in fixed relation to slider plates 50 and 52 (and/or integral therewith), wherein the cam assemblies 86 and 88 can slide with respect to channels 36 and 38, for example within slots of the channels 36 and 38.

To assemble slider plate 50 to base 32, shoe 84 is inserted (i.e., slid) into channel 56. Together, slider plate 50 and shoe 84 are then inserted into channel 36 such that apertures in channel 36 are aligned with springs 110 and 130 and threaded bores 132 and 134 in shoe 84. In an alternative embodiment, springs 110 and 130 are located separate from their respective cam assemblies. For example, one or more biasing members can be positioned at various locations along shoes 84 and 90 so as to urge shoes 84 and 90 away from base 32. In a particular embodiment, springs are positioned in pockets formed in the shoes 84 and 90 that are configured to capture at least a portion of the springs. Cam levers 100 and 120 are coupled to their corresponding threaded shafts 104 and 124 through corresponding connectors 102 and 122, respectively. In one embodiment, connectors 102 and 122 include a nut and bolt to fasten cam levers 100 and 122 to shafts 104 and 124, respectively. Shaft 104 is inserted through washers 106 and 108, channel 36, spring 110 and into threaded bore 132 in shoe 84. Similarly, shaft 124 is inserted through washers 126 and 128, channel 36, spring 130 and into threaded bore 134 in shoe 84. Threaded shafts 104 and 124 are threaded into bores 132 and 134, respectively, to a point where cam assemblies 86 and 88 still allow sliding movement of slider plate 50 with respect to base 32. Springs 110 and 130 urge shoe 84 away from base plate 32 such that when cam assemblies 86 and 88 are unlocked, slider plate 50 can easily slide with respect to base 32.

Figure 6:
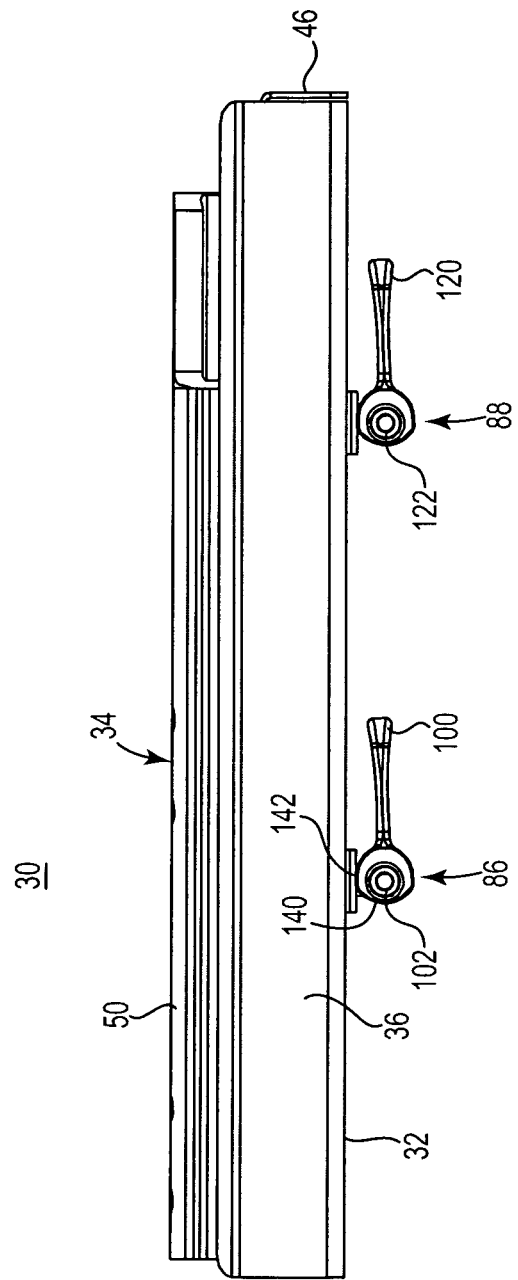
FIG. 6 is a side view of the accessory support assembly of FIG. 2.

To lock slider plates 50 and 52 with respect to base 32, cam assemblies 86, 88, 92 and 94 are operated by actuating (i.e., rotating) corresponding cam levers (e.g., cam levers 100 and 120) from an unlocked position (i.e., in a vertical orientation) to a locked position (i.e., in a horizontal orientation), as illustrated in FIG. 6. Due to an irregular shape of cam levers 100 and 120, rotational movement of the cam levers 100 and 120 press against a bottom surface of channel 36, which in turn creates a downward force on threaded shafts 104 and 124 as well as shoe 84. In particular, an angle between a first cam surface (e.g., surface 140 of cam lever 100) and a second cam surface (e.g., surface 142 of cam lever 100) can be selected so as to prevent unintentional rotation of cam levers away from the locked position. In one embodiment, the angle between surfaces 140 and 142 is greater than 90 degrees and, in one preferred embodiment, is approximately 100 degrees.

When locking mechanisms 80 and 82 are operated by rotating cam levers (e.g., cam levers 100 and 120), shoes 84 and 90 are pulled toward base 32 and prevent slider plates 50 and 52 from relative movement with respect to base 32. In particular, force placed on shoes 84 and 90 from respective cam assemblies 86, 88, and 92, 94 cause sides of each shoe 84 and 90 to engage a lower portion of respective inner channels 56 and 64, such that relative movement of slider plates 50 and 52 with respect to base 32 is prevented. To transition assembly 30 to the unlocked configuration, cam assemblies 86, 88, 92 and 94 are operated such that corresponding cam levers are rotated to a vertical orientation, allowing sliding movement between slider assembly 34 and base 32. As such, a user can slide accessory 12 forward and/or backward to a desired position. After moving accessory 12, the user can lock slider assembly 34 with respect to base 32 by operating cam assemblies 86, 88, 92 and 94, preventing sliding movement of accessory 12 with respect to motorcycle 10. As such, accessory support assembly 30 serves as a quick adjust mechanism where locking mechanisms 80 and 82 can be quickly locked/unlocked yet still adequately secure accessory 12 in place during operation of motorcycle 10.

Figure 7:
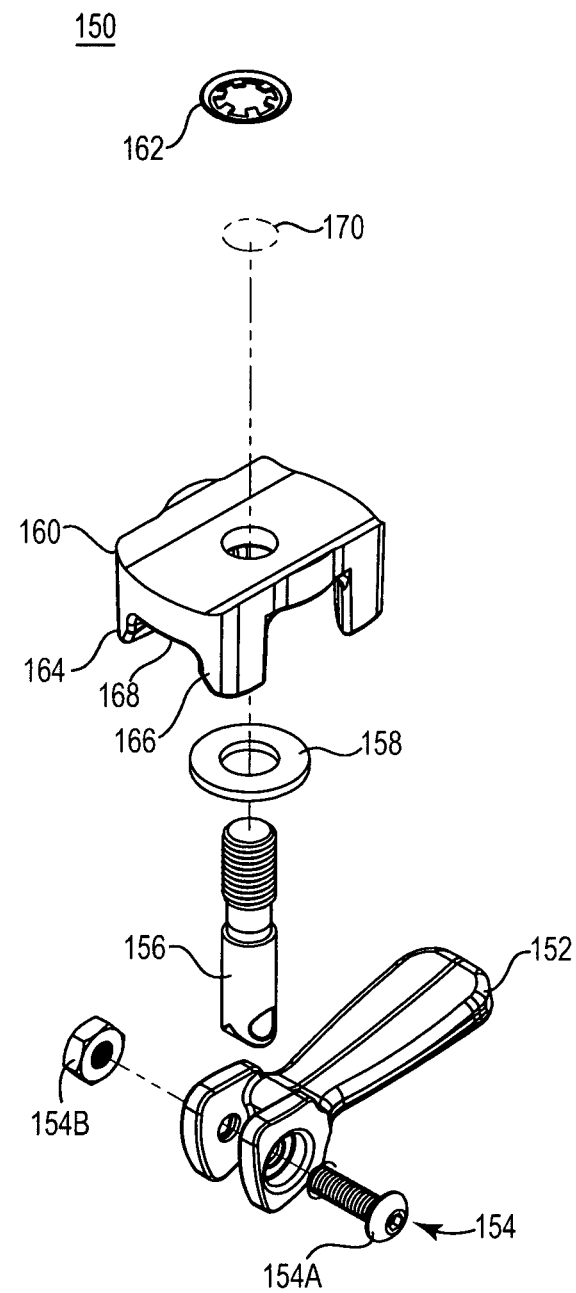
FIG. 7 is an exploded view of an alternative cam assembly for use with the accessory support assembly of FIG. 2.

FIG. 7 is an exploded view of a cam assembly 150 that can be used in place of one or more of cam assemblies 86, 88, 92, and 94 discussed above. Similar to these cam assemblies, cam assembly 150 includes a cam lever 152, connector 154 (formed of a bolt 154A and nut 154B), threaded shaft 156 and metallic washer 158. Cam assembly 150 further includes a clip 160 and retaining element 162. Clip 160 is provided with spaced apart shoulders (e.g., shoulders 164 and 166) on opposed sides of the clip 160 that form a corresponding recess (e.g., recess 168). When cam lever 152 is positioned in the locked position (i.e., in a horizontal orientation) cam lever 152 is positioned within a recess (e.g., recess 168) of clip 160 so as to prevent rotation of cam lever 152 and thus threaded shaft 156. In one embodiment, clip 160 is formed of polyurethane. Retaining element 162 can be coupled to threaded shaft 156 in order to prevent threaded shaft from coming out of an aperture (e.g., aperture 170), for example within a channel.

It is to be understood that the features of the various exemplary embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An adjustable accessory support assembly for adjusting a position of a motorcycle accessory relative to a motorcycle, comprising:
    a base forming a first channel and a second channel;
    a slider assembly configured for connection to the motorcycle accessory and forming a first guide positioned in the first channel and a second guide positioned in the second channel, the first guide forming a first inner channel and the second guide forming a second inner channel, wherein the first and second guides each comprise a first inner channel portion and a second inner channel portion, the second inner channel portion having a narrower width than the first inner channel portion;
    a first locking mechanism coupling the first guide to the base, the first locking mechanism including a first shoe positioned in the first inner channel; and
    a second locking mechanism coupling the second guide to the base, the second locking mechanism including a second shoe positioned in the second inner channel,
    wherein the first shoe and the second shoe each comprise a portion having a width greater than each second inner channel portion, the first locking mechanism and the second locking mechanism are configured to transition the support assembly between a first, locked configuration with each shoe portion frictionally engaging each second inner channel portion and a second, unlocked configuration.

2. The support assembly of claim 1, further comprising a plurality of inserts connected to the slider assembly and forming a bearing between the slider assembly and the base.

3. The support assembly of claim 2, wherein the slider assembly includes a plurality of insert receiving portions, the plurality of inserts being positioned in the plurality of insert receiving portions.

4. The support assembly of claim 3, wherein each of the plurality of insert receiving portions are configured to define a channel and wherein each of the plurality of inserts are configured to define a T-shaped insert such that a leg of the T-shaped insert is disposed in the channel and a base portion of the T-shaped insert forms the bearing.

5. The support assembly of claim 2, wherein the plurality of inserts are formed of ultra high molecular weight polyethylene.

6. The support assembly of claim 1, wherein the first locking mechanism includes first and second cam assemblies configured to lock the first shoe and first guide within the first channel and wherein the second locking mechanism includes third and fourth cam assemblies configured to lock the second shoe and second guide within the second channel.

7. The support assembly of claim 6, wherein the first locking mechanism further includes first and second springs urging the first shoe away from the base plate and the second locking mechanism further includes third and fourth springs urging the second shoe away from the base plate.

8. The support assembly of claim 1, further comprising an overtravel stop positioned at a front of the base and a flange positioned at a rear of the base, the overtravel stop and flange restricting sliding movement of the slider assembly between a point where the slider assembly contacts the overtravel stop and a point where the slider assembly contacts the flange.

* * * * *